Feb. 25, 1936.　　A. J. BRADFORD　　2,031,817
FILM DRIVING APPARATUS
Filed May 14, 1929
Fig. 1.
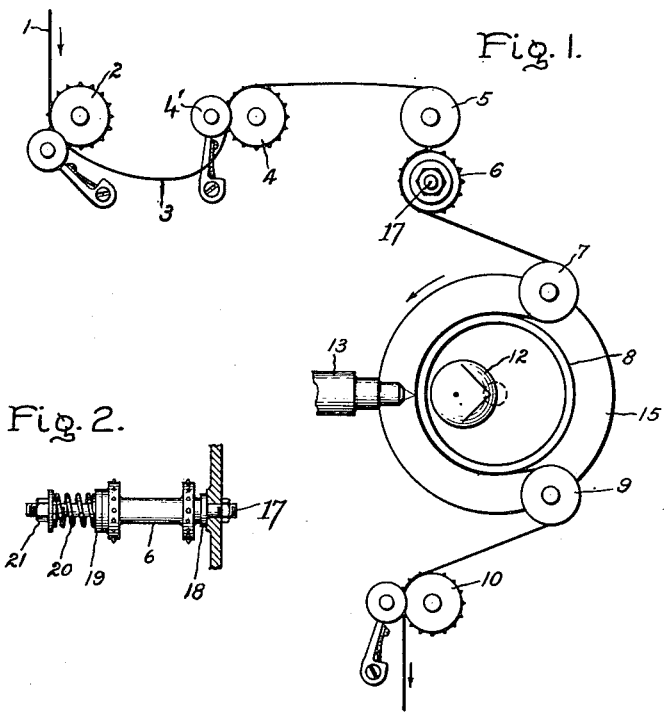
Fig. 2.
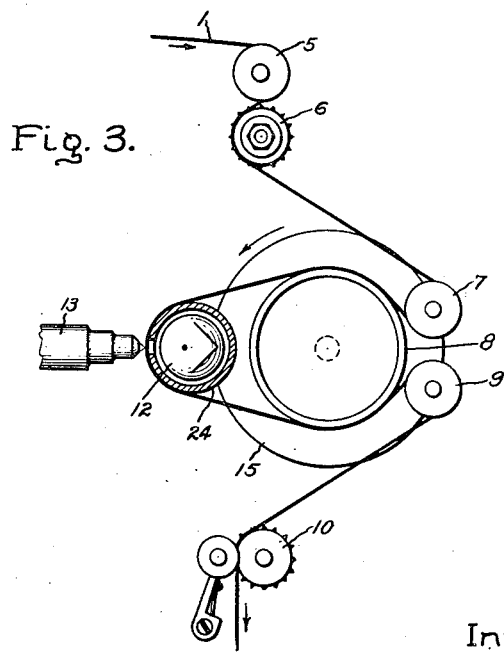
Fig. 3.
Inventor
Arthur J. Bradford,
by Charles E. Miller
His Attorney.

Patented Feb. 25, 1936

2,031,817

UNITED STATES PATENT OFFICE 2,031,817

FILM DRIVING APPARATUS

Arthur J. Bradford, Alplaus, N. Y., assignor to General Electric Company, a corporation of New York Application May 14, 1929, Serial No. 363,053

9 Claims. (Cl. 274—5)

My invention relates to apparatus for making a record on a moving film of the motion picture type and also to apparatus by which a reproduction is made from a record on such a film; more particularly it relates to that part of the apparatus by means of which the film is driven. Certain forms of apparatus of this character heretofore constructed for reproducing sound from a film record having included a drum for supporting the film at the point at which it was subjected to the light beam and to increase the adhesion between the film and the drum one or more pressure rolls have been used to press the film firmly against the drum surface. Another expedient to increase the adhesion between the drum and the film has been the use of one or more friction bands of elastic material such as rubber on the face of the drum. Under certain circumstances difficulties have arisen with such apparatus in maintaining a movement of the film past the light beam with the desired steadiness or freedom from vibration. This, I believe, in part is a result of slight variations in the surface of the band or bands from a true circle when originally machined and in part is a result of variations from the original curvature which develop with age and use, for it is well known how rubber swells and becomes distorted with age and in the presence of oil, etc. Waves or other irregularities in the movement or position of the film as it passes the light beam are fatal to good sound recording and reproduction. The usual pressure roll may under proper conditions either in itself alone or in cooperation with the yielding drum surface set up vibrations in the film as it passes the light beam.

It is an object of my invention to provide improved apparatus of the character referred to in which such difficulties as those mentioned above are avoided and which is of simple construction, efficient in operation and inexpensive to manufacture.

My invention will be better understood from the following description taken in connection with the accompanying drawing, and its scope will be pointed out in the appended claims.

Referring to the drawing, Fig. 1 illustrates one embodiment of my invention; Fig. 2 is a detail of Fig. 1 showing the film tensioning means; and Fig. 3 illustrates a modification.

In illustrating my invention I have chosen to show it by way of example as forming a part of an apparatus for reproducing sound from a sound film record although it is to be understood that my invention is equally applicable to other apparatus, for example, apparatus for recording sound on a film or other type of devices wherein a phonographic element co-operates with a film at a recording or reproduction point. In Fig. 1, I have shown the film I as passing over the sprocket 2 which in this particular example has an intermittent movement and forms a part of a picture projector, not shown, the film having both sound and picture records thereon. From sprocket 2 the film passes through loop 3 to sprocket 4, thence over idler 5 to the main tensioning sprocket or roller 6. From this sprocket the film passes over idler 7, around the hollow drum 8, over idler 9, to drive sprocket 10 and thence to the take-up reel, not shown. Sprockets 4 and 10 are connected together by gearing, not shown, and are driven at a uniform speed by a suitable motor, also not shown. The film is held in contact with the roller 4 by the small roller 4'. Within the drum I have shown the photo-electric cell 12 which it will be understood is connected to a loud speaker or other translating device through suitable thermionic amplifying means. At the opposite side of the film is the optical system shown in part at 13 by means of which a narrow light beam is focused at a given point, the point of control, on the sound record on the film. That portion of the film bearing the sound record may, for example, overhang the edge of the drum or if preferred the drum may be constructed of transparent material. To give the drum the necessary inertia I have shown it provided with the rotatable mass or flywheel 15. This may be integrally connected to the drum or may be fixed to the same shaft as the drum. Under certain circumstances the drum itself may be constructed so as to have the desired mass. The purpose of providing the drum with a relatively large inertia mass is to absorb or smooth out the various vibrations or variations in speed to which the film is subject so that as it passes the light beam it shall move as nearly as possible at an absolutely uniform rate. In order that the drum and associated mass shall perform this function it is essential that the film shall adhere to the face of the drum to such a degree that no slipping whatever takes place between the film and the drum. I have found that the desired adhesion between the film and drum can be obtained even though the latter has a polished metal face, constructed, for example, of steel, without the aforementioned friction bands, and without the use of pressure rolls by causing the film to have a predetermined tension as it is drawn on to the drum. Various means may be provided for producing this tension. A means which I have found to be satisfactory and which I have illustrated on the drawing comprises the film engaging sprocket 6 which is freely rotatable on the bearing post 17 having the fixed friction collar 18 in engagement with one end of the sprocket. At the other end of the sprocket the post has splined thereto the friction disk 19 against which presses the coil spring 20. The sprocket 6 has friction surfaces at opposite ends and is yieldingly clamped between the collar 18 and disk 19 by the spring 20 whose tension may be varied by turning the nut 21 on the bearing post. By means of this adjustable brake the proper degree of film tension is easily produced such that no slipping occurs between the film and the drum, yet the film is at no time tensioned so great as to make it liable to be torn at the sprocket holes or elsewhere. Idlers 7 and 9 which are shown also as guide rolls are spaced from the drum face permitting the free passage of film splices between them and the drum.

In Fig. 3 I have shown a modification in which the film contacts with the drum at two spaced points and between those points passes in a loop over a fixed skid enclosing the photo-electric cell. The idler 5, tensioning sprocket 6, idler 7, drum 8, idler 9, sprocket 10, optical system 13 and flywheel 15 are similar to the correspondingly numbered elements in Fig. 1. In this case the idlers 7 and 8 are arranged closer together so as to obtain as large a contact angle as possible between film and drum. The fixed skid 24 is shown completely enclosing the photo-electric cell 12 and as having an opening opposite the optical system 13 through which the focused light beam passes on into the cell. The drum in this modification may be the full width of the film and may be opaque. Moreover, since the photo-electric cell is outside of the drum the latter may if desired be solid.

As a result of the construction which I have devised I can dispense with the use of an elastic friction band or bands on the drum and of any pressure roll to hold the film against the drum, yet by reason of the adhesion obtained between the film and the drum as a result of the definite film tension and the fact that the film rests on the firm face of the drum, no vibrations of the film occur either longitudinally or transversely where it passes through the light beam.

What I claim as new and desire to secure by Letters Patent of the United States, is:

1. Apparatus of the character described for moving a film without vibration through a point of control comprising a film driven smooth faced drum over which the film is wrapped, an inertia mass directly connected with the drum, means for withdrawing the film from the drum, and braking means engaging the film passing to the drum operative to produce a predetermined tension of the film on the drum for causing it to adhere to the drum without slippage.

2. Apparatus of the character described for moving a film without vibration through a narrow light beam comprising a film driven smooth faced drum over which the film is wrapped, an inertia mass directly connected with the drum, a sprocket arranged to withdraw the film from the drum, and means for causing the film to adhere to the face of the drum without slippage, said means comprising a device for opposing the movement of the film toward the drum to effect a predetermined tension in the film.

3. Apparatus of the character described comprising means for supporting and steadying the movement of a film through the focal point of a light beam, said means including a film driven smooth faced drum having a flywheel directly connected therewith, a sprocket arranged to withdraw the film from the drum, and means for causing the film firmly to adhere to the drum comprising a member engaging the film passing toward the drum having a braking device for producing a predetermined tension in the film, said member being separated from said drum.

4. Apparatus of the character described comprising a film driven smooth faced drum having a flywheel directly connected therewith and adapted to support and to be rotated by a film, a sprocket arranged to draw the film from the drum, the film where supported by the drum being adapted to pass through a focused light beam, a sprocket arranged to engage the film passing toward the drum, a friction brake for the last mentioned sprocket, and means for adjusting the action of said brake to vary the adhesion of the film and drum.

5. Photophonographic apparatus comprising a film sprocket, a phonographic means, means for drawing a record strip from said sprocket past said phonographic means, and friction means in cooperative relation with said record strip between said sprocket and said phonographic means, whereby said record strip travels at a uniform speed past said phonographic means.

6. The combination with a motion picture projector having an intermittent film progressing mechanism including an intermittent sprocket and a lower constant speed sprocket, of a sound film attachment including, an adjustable tensioned guiding means including a main roller and smaller roller and over which the film below the lower loop is passed, and a fixed skid interposed between the latter and the constant speed sprocket whereby the loop is maintained between the guiding means and the intermittent sprocket and the constant speed sprocket draws the film through the attachment.

7. The combination as set forth in claim 6 with an adjustable brake for said main roller for regulating the surface action on the film during the pulling thereof thereover and whereby the lower loop in the film is not interfered with.

8. A sound film attachment for a motion picture projector having a constant speed sprocket and means providing lower film loop, comprising an adjustable tensioned guiding means including a main roller and smaller roller and over which the film below the lower loop is passed, and a fixed skid interposed between the latter and the constant speed sprocket whereby the loop is maintained between the guiding means and the intermittent sprocket and the constant speed sprocket draws the film through the attachment.

9. The combination set forth in claim 8 with an adjustable brake for said main roller for regulating the surface action on the film during the pulling thereof thereover, and whereby the lower loop in the film is not interfered with.

ARTHUR J. BRADFORD.